(12) United States Patent
Steury

(10) Patent No.: US 6,981,729 B2
(45) Date of Patent: Jan. 3, 2006

(54) DRIVE ASSEMBLY FOR A RETRACTABLE TOP OF A MOBILE HOUSING

(75) Inventor: Edwin J. Steury, Sarasota, FL (US)

(73) Assignee: Steury Brothers LLC, New Paris, IN (US)

(*) Notice: Subject to any disclaimer, the term of this patent is extended or adjusted under 35 U.S.C. 154(b) by 0 days.

(21) Appl. No.: 10/832,016

(22) Filed: Apr. 26, 2004

(65) Prior Publication Data

US 2005/0236856 A1    Oct. 27, 2005

(51) Int. Cl.
B60P 3/34    (2006.01)
(52) U.S. Cl. .................. 296/26.04; 296/171; 296/173
(58) Field of Classification Search .......... 296/26.04, 296/26.05, 156, 165, 168, 171, 173, 175, 296/176; 52/66
See application file for complete search history.

(56) References Cited

U.S. PATENT DOCUMENTS

| 3,044,312 | A | | 7/1962 | Hall et al. |
| 3,507,535 | A | * | 4/1970 | Wallace ..................... 296/173 |
| 3,508,782 | A | | 4/1970 | Hostetler et al. |
| 3,528,698 | A | | 9/1970 | Miller |
| 3,674,305 | A | | 7/1972 | Steury |
| 3,734,559 | A | | 5/1973 | Touchette |
| 3,749,439 | A | * | 7/1973 | Ferguson ................. 296/26.05 |
| 3,882,575 | A | | 5/1975 | Jolly |
| 4,171,843 | A | | 10/1979 | Steury |
| 4,272,997 | A | | 6/1981 | Groth |
| 5,528,948 | A | | 6/1996 | De Gelis |
| 5,704,677 | A | | 1/1998 | Steury et al. |
| 5,769,485 | A | * | 6/1998 | Bontrager et al. .......... 296/171 |
| 5,951,096 | A | | 9/1999 | Steury et al. |
| 6,086,133 | A | | 7/2000 | Alonso |
| 6,206,456 | B1 | | 3/2001 | Steury et al. |
| 6,443,516 | B2 | | 9/2002 | Lambright |
| 6,447,038 | B1 | * | 9/2002 | Davis et al. ............. 296/26.05 |
| 6,494,524 | B2 | | 12/2002 | Lambright |
| 6,527,336 | B2 | | 3/2003 | Hernandez et al. |
| 6,679,542 | B1 | * | 1/2004 | Semotuk ..................... 296/174 |

* cited by examiner

Primary Examiner—H. Gutman
(74) Attorney, Agent, or Firm—Trexler, Bushnell, Giangiorgi, Blackstone & Marr, LTD (57) ABSTRACT

A drive assembly for a lifting the top of a mobile housing includes a first and second pairs of push-pull springs. The springs are connected to an drive assembly and to the top. The drive assembly includes a threaded shaft having a threaded block which travels thereon and a cable associated therewith. When the threaded shaft is rotated, the push-pull springs move. A pulley structure is provided for allowing adjustment of the position of the first pair of springs relative to the second pair of springs.

11 Claims, 4 Drawing Sheets

DRIVE ASSEMBLY FOR A RETRACTABLE TOP OF A MOBILE HOUSING

BACKGROUND OF THE INVENTION

Travel trailers and other mobile housings have heretofore been provided with collapsible tops that can be moved between raised and lowered positions. Various lift mechanisms have been installed to raise and lower the top. Such mechanisms have generally included a collapsible standard or jack at each of the four corners of the top and means for simultaneously actuating the jacks. Such prior lift mechanisms are disclosed in U.S. Pat. Nos. 3,674,305, 4,171,843, 5,704,677 and 5,951,096. In each of these prior lift mechanisms, a central actuator is connected to the corner jacks by flexible incompressible springs guided through conduits having one end rigidly fixed to the central actuator and the opposite end rigidly fixed to the frame of the trailer adjacent the jack to be actuated.

OBJECTS AND SUMMARY OF THE INVENTION

A general object of the present invention is to provide a drive assembly for a retractable top of a mobile housing.

Another general object of the present invention is to provide a drive assembly that can be adjusted to provide differing heights to the front and the back of the retractable top.

Another general object of the present invention is to provide a drive assembly which can be easily retrofitted to a trailer.

Briefly, and in accordance with the foregoing, the present invention discloses a drive assembly for a lifting the top of a mobile housing. The drive assembly includes a first pair of push-pull springs and a second pair of push-pull springs which have first ends that are connected to an actuator assembly and second ends that are attached to the top of the mobile housing. The actuator assembly includes a threaded shaft which extends through a threaded block which is provided on the first ends of the first push-pull elements. The first ends of the second push-pull elements are connected together by a clamp. The clamp is attached to the threaded block by a cable which extends around a pulley. The pulley is mounted in a pulley housing. The pulley housing is attached to the housing which houses components of the actuator assembly, instead of being attached to the frame of the mobile housing. As a result, the position of the pulley relative to the actuator assembly housing can be adjusted. This results in the adjustment of the second pair of push-pull springs relative to the first pair of push-pull springs, thereby adjusting the height of the top of the mobile housing attached to the second pair of push-pull springs relative to the height of the top of the mobile housing attached to the first pair of push-pull springs.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

2

DETAILED DESCRIPTION OF THE ILLUSTRATED EMBODIMENTS

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 1:
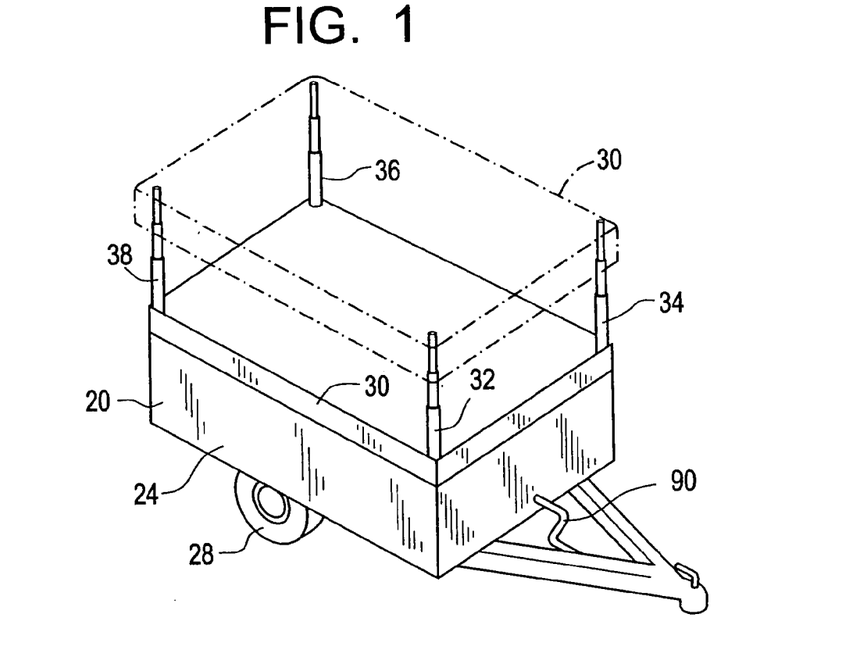
FIG. 1 is a perspective view of a mobile housing showing the top in a lowered position in full line and the top in a raised position in phantom lines.
Figure 2:
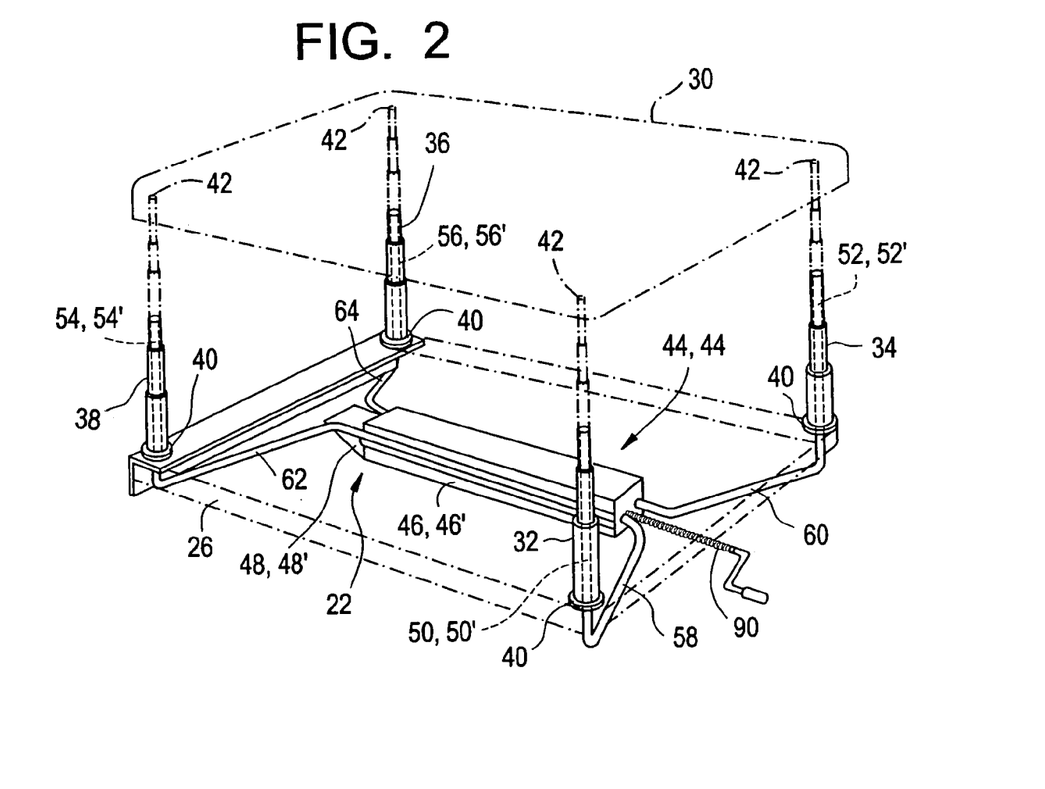
FIG. 2 is a perspective view of a lift assembly for raising and lowering the top of the mobile housing which incorporates features of the present invention.
Figure 3:
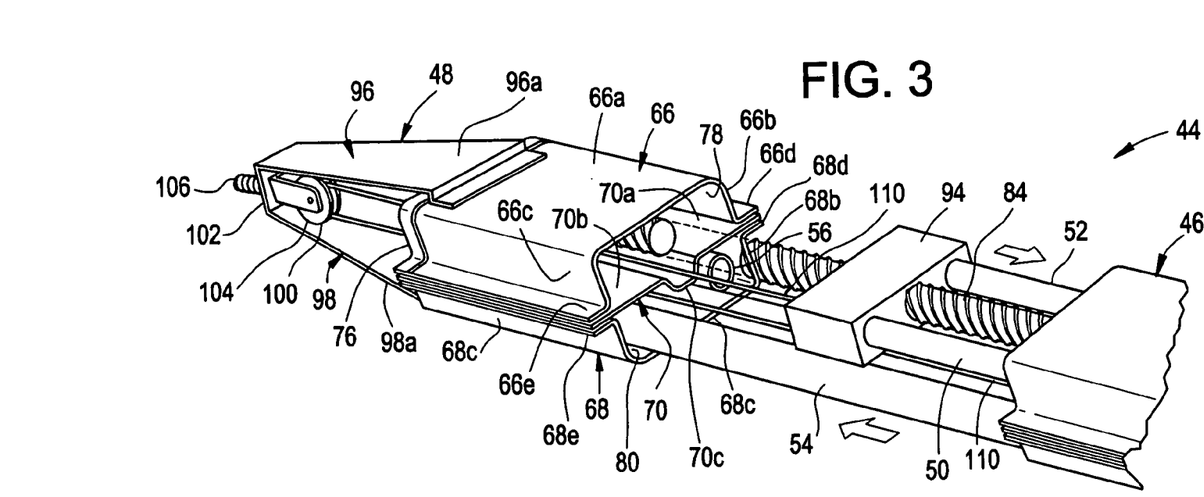
FIG. 3 is a partial perspective of the lift assembly, shown broken away, which incorporates features of a first embodiment of the invention.
Figure 4:
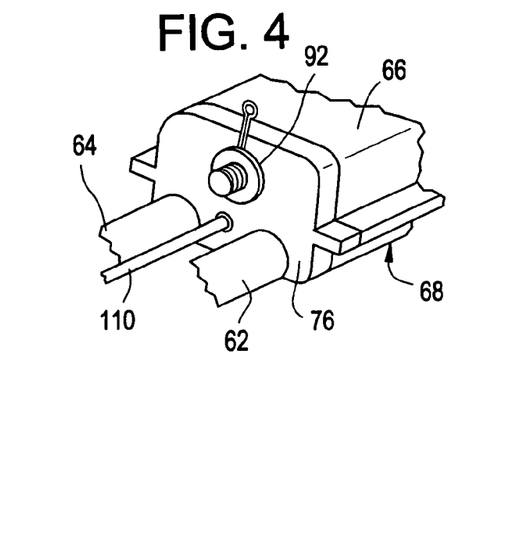
FIG. 4 is a partial perspective view of a section of the lift assembly shown in FIG. 3.
Figure 5:
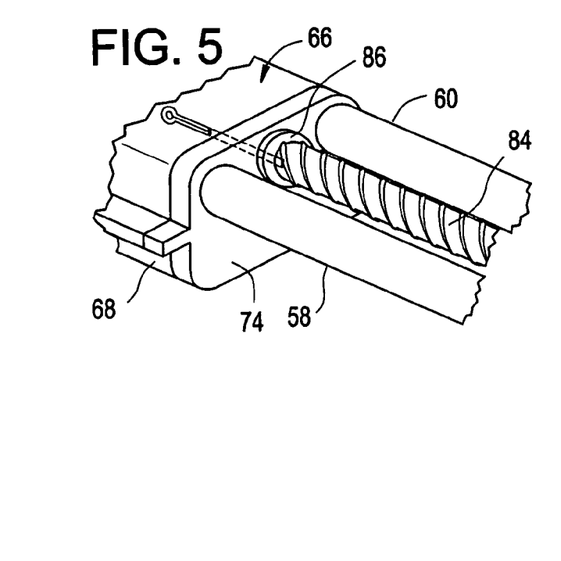
FIG. 5 is a partial perspective view of an end of the lift assembly shown in FIG. 3.
Figure 6:
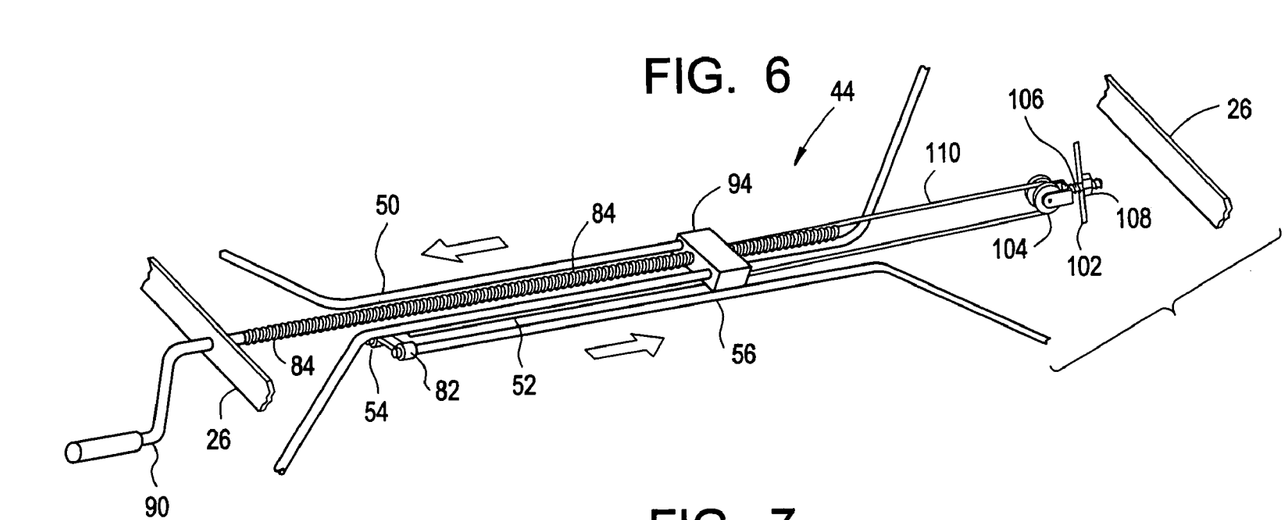
FIG. 6 is a partial perspective view of the lift assembly shown in FIG. 3 with the housing removed.
Figure 7:
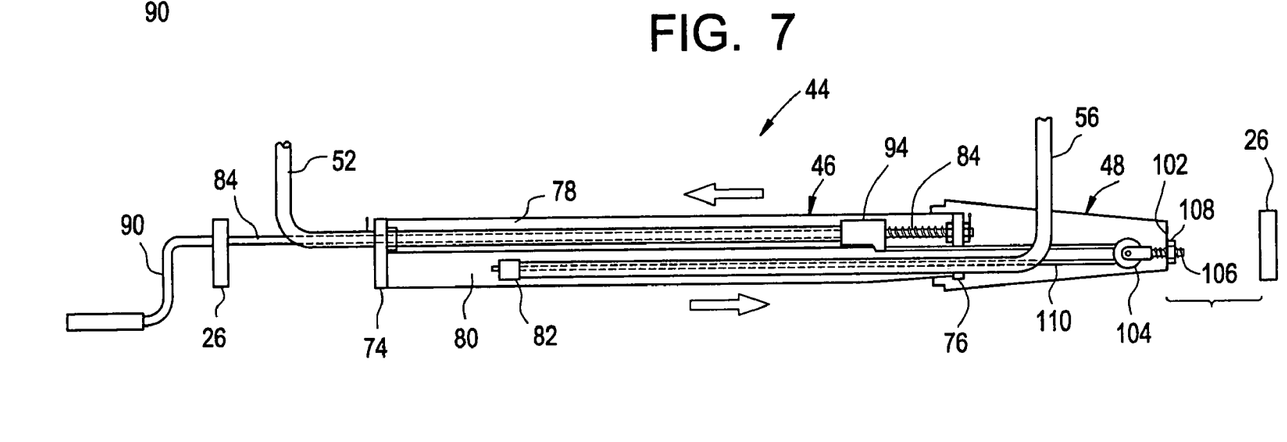
FIG. 7 is a side elevational view of the lift assembly shown in FIG. 3.

A mobile housing such as a travel trailer 20 is shown in FIG. 1, which trailer includes a lift mechanism 22 incorporating the present invention and shown in FIG. 2. The trailer 20 includes a body 24 supported on a rectangular frame 26 which, in turn, is mounted on wheels 28. The trailer 20 has a top 30 which may be moved between a lowered or closed position shown in solid lines in FIG. 1 and a raised or open position shown in broken lines in FIG. 1. The lift mechanism 22 is connected with the top 30 in order to raise and lower the top 30 in the manner described below.

The lift mechanism 22 includes a plurality of extendable and collapsible standards or jacks 32, 34, 36, 38 respectively located at each of four corners of the body 24. Each jack 32, 34, 36, 38 includes a plurality of telescoping sections with lower end sections mounted to the frame or floor of the trailer 20 as at 40 in FIG. 2 and upper end sections connected to the top 30 as at 42 in FIG. 2.

Figure 8:
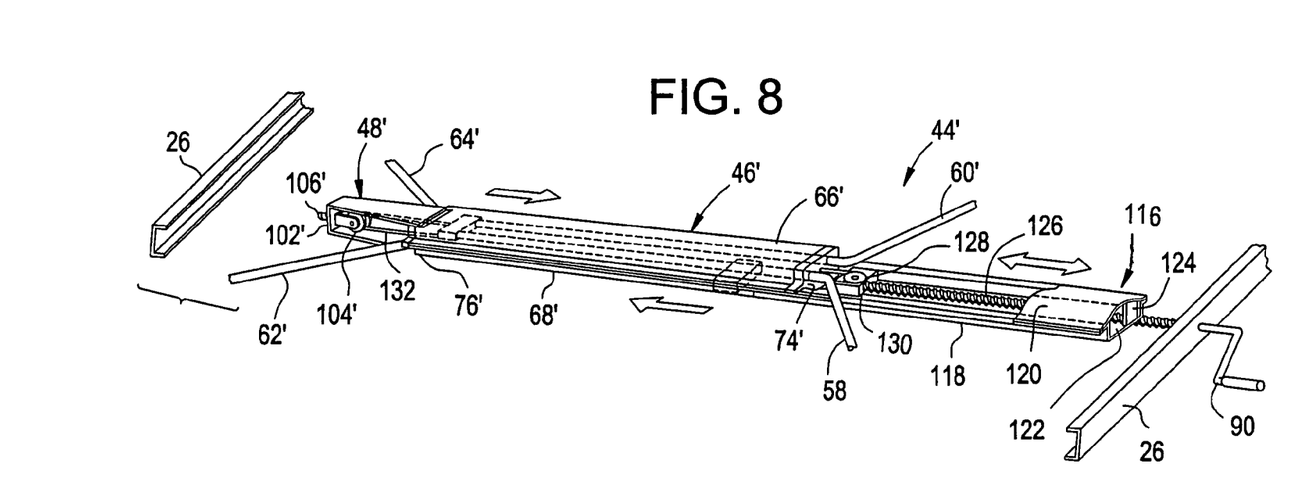
FIG. 8 is a partial perspective view of the lift assembly, shown broken away, which incorporates features of a second embodiment of the invention.
Figure 9:
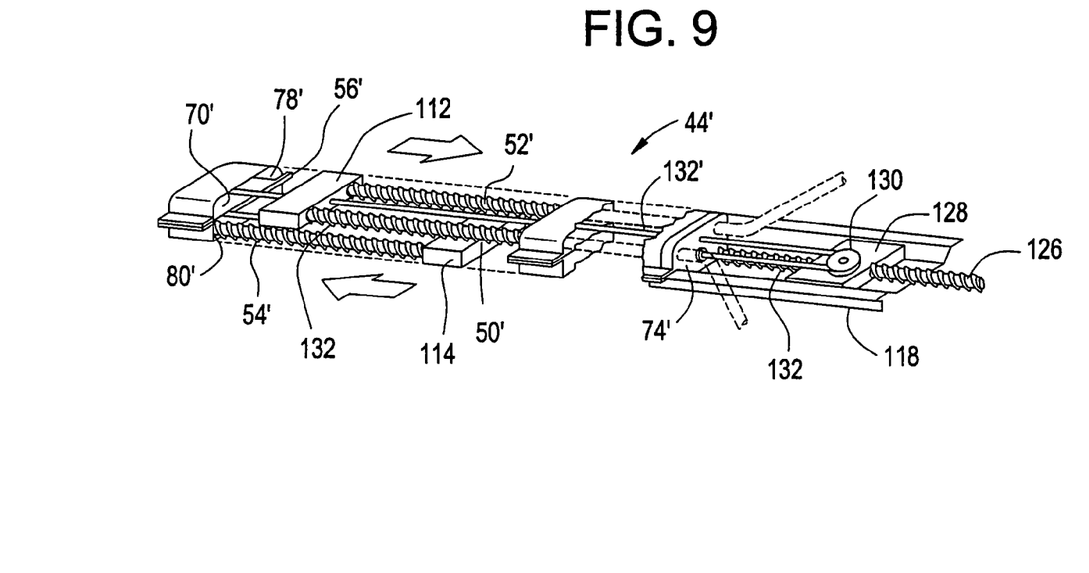
FIG. 9 is a partial perspective view of the lift assembly of FIG. 8, shown broken away.

The lift mechanism 22 includes a drive assembly 44, 44' preferably mounted generally centrally beneath the floor of the trailer 20 as shown in FIG. 2. The drive assembly 44, 44' includes a main housing 46, 46' and a pulley housing 48, 48' provided at a rear end thereof. The main housing 46, 46' and the pulley housing 48, 48' are preferably formed of metal. A first embodiment of the drive assembly 44 is shown in FIGS. 3–7. A second embodiment of the drive assembly 44' is shown in FIGS. 8 and 9. Like elements of the first and second embodiments are denoted with like reference numerals with the elements of the second embodiment having a prime thereafter.

Each embodiment of the drive assembly 44, 44' includes an upper pair of flexible and incompressible push-pull elements or springs 50, 52; 50', 52' extending from within the main housing 46, 46' to the jacks 32, 34 respectively, and a lower pair of push-pull elements or springs 54, 56; 54', 56' extending from the main housing 46 to the jacks 36, 38 respectively. The push-pull elements or springs 50, 52; 54, 56; 50', 52', 54', 56' are actuated in the manner described below for raising and lowering the top 30. Flexible and bendable guide and support conduits 58, 60, 62, 64; 58', 60', 62', 64' extend from the main housing 46, 46' for slidably receiving and guiding the push-pull elements or springs 50, 52; 54, 56; 50', 52', 54', 56' to the four corners of the trailer 20. End fittings can be provided between the conduits 58, 60, 62, 64; 58', 60', 62', 64' extend from the main housing 46, 46' as is known in the art.

The specifics of the first embodiment of the drive assembly 44 are now described with reference to FIGS. 3–7.

The main housing 46 includes an upper portion 66, a lower portion 68 and an intermediate wall 70. The upper portion 66 is generally U-shaped and includes an upper wall 66a, a right side wall 66b which depends generally perpendicularly and downwardly from a right edge of the upper wall 66a and a left side wall 66c which generally perpendicularly and downwardly from a left edge of the upper wall 66a. A right flange 66d extends outwardly from and generally perpendicularly to the opposite end of the right side wall 66b. Likewise, a left flange 66e extends outwardly from and generally perpendicularly to the opposite end of the left side wall 66c. The lower portion 68 is the mirror image of the upper portion 66. The lower portion 68 is generally U-shaped and includes an lower wall 68a, a right side wall 68b which extends generally perpendicularly and upwardly from a right edge of the lower wall 68a and a left side wall 68c which extends generally perpendicularly and upwardly from a left edge of the lower wall 68a. A right flange 68d extends outwardly from and generally perpendicularly to the opposite end of the right side wall 68b. Likewise, a left flange 68e extends outwardly from and generally perpendicularly to the opposite end of the left side wall 68c. The intermediate wall 70 has a generally planar right side section 70a and a generally planar left side section 70b with a U-shaped middle section 70c therebetween at approximately the midpoint of the intermediate wall 70. The edges of the right side section 70a and the right flanges 66d, 68d are joined together by suitable means, such as welding. The edges of the left side section 70b and the left flanges 66e, 68e are joined together by suitable means, such as welding. In the assembled condition, the upper wall 66a, the lower wall 68a, the right side section 70a and the left side section 70b are parallel to each other. The front and rear ends of the upper and lower portions 66, 68 are closed by respective front and rear end plates 74, 76. The intermediate wall 70 extends along the length of the main housing 46 between the end plates 74, 76 such that the U-shaped section 70c extends along the length of the main housing 46. An upper chamber 78 is defined between the upper portion 66 and the intermediate wall 70 and a lower chamber 80 is defined between the lower portion 68 and the intermediate wall 70.

The upper pair of push-pull springs 50, 52 are mounted in the upper chamber 78 of the main housing 46 and extend outwardly therefrom toward the front of the body 24. Push-pull spring 50 is positioned proximate the left side section 70b of the intermediate wall 70. Push-pull spring 52 is positioned proximate the right side section 70a of the intermediate wall 70.

The lower pair of push-pull springs 54, 56 are mounted in the lower chamber 80 of the main housing 46 and extend outwardly therefrom toward a rear end of the body 24. Push-pull spring 54 is positioned proximate the right side section 70b of the intermediate wall 70 and push-pull spring 56 is positioned proximate the left side section 70a of the intermediate wall 70. The ends of the lower push-pull springs 54, 56 are connected together by a clamp 82.

A metal threaded rod 84 is rotatably mounted in the upper chamber 78 between the upper pair of push-pull springs 50, 52 and generally sits within the U-shaped section 70c of the intermediate wall 70. A front bushing (not shown) is mounted on the interior of the front end plate 74 and a rear bushing (not shown) is mounted on the interior of the rear end plate 76. The threaded rod 84 passes through the front bushing, through the front end plate 74 and through a pinned washer 86 on the exterior of the front end plate 74. The pinned washer 86 secures the threaded rod 84 to the main housing 46. The threaded rod 84 further extends through the frame 26 of the trailer 20. A handle 90 is attached to the front end of the threaded rod 84 which extends outwardly from the frame 26. The rear end of the threaded rod 84 passes through the rear bushing, through the rear end plate 76 and through a pinned washer 92 on the exterior of the rear end plate 76. The pinned washers 86, 92 secure the threaded rod 84 to the main housing 46 to prevent axial movement of the threaded rod 84 relative to the main housing 46, while allowing rotational movement of the threaded rod 84 relative to the main housing 46.

A threaded block 94 is mounted on the threaded rod 84 between the front and rear end plates 74, 76 for travel therealong. The ends of the upper push-pull springs 50, 52 are attached to the threaded block 94 by suitable means such that when the threaded block 94 travels along the threaded rod 84, the upper push-pull springs 50, 52 move.

The pulley housing 48 includes a generally U-shaped upper portion 96 and a generally U-shaped lower portion 98 which are joined together by suitable means such as welding. The front ends of the upper and lower portions 96, 98 are attached to the rear end of the main housing 46 by suitable means such as welding. The rear ends of the upper and lower portion 96, 98 are closed by an end plate 102 to form a pulley chamber 100 therein. An upper wall 96a of the upper portion 96 tapers from the rear of the main housing 46 to the end plate 102 and a lower wall of the lower portion 98a tapers from the rear of the main housing 46 to the end plate 102.

A pulley 104 is mounted in the pulley housing 48 and the position of the pulley 104 can be adjusted toward or away from the rear end plate 76. A threaded member 106 is fixedly attached to the rear end of the pulley 104 and extends through the end plate 102. A nut 108 is mounted on the threaded member 84 on the exterior of the end plate 102. To adjust the position of the pulley 104 toward or away from the end plate 102, the threaded member 106 is rotated, thereby axially translating and either shortening or lengthening the threaded member 106 within the pulley chamber 100. The pulley 104 is mounted within the pulley housing 48 which is attached to the main housing 46, as opposed to being mounted on the frame 26 of the trailer 20 as in the prior art for reasons described herein.

A cable 110 is attached to the threaded block 94 and extends therefrom. The cable 110 further extends through the rear end wall 76 of the main housing 46 proximate the upper chamber 78, around the pulley 104, through the rear end wall 76 of the main housing 46 proximate the lower chamber 80, and is attached to the clamp 82. The cable 110 is formed of a stainless steel. When the threaded block 94 travels along the threaded rod 84 thereby moving the upper push-pull springs 50, 52, the cable 110 moves, thereby moving the lower push-pull springs 54, 56. When the position of the pulley 104 is changed within the pulley housing 48, the positions of the lower push-pull springs 54, 56 are adjusted relative to the upper push-pull springs 50, 52. As a result, the height of the front and rear of the top 30 can be adjusted relative to each other in the even they become uneven from usage or from manufacturing inconsistencies in the top 30. This results in a significant advantage over the prior art which does not provide for ready adjustment without significant disassembly of the apparatus.

To raise the top 30 of the trailer 20, the handle 90 is turned which rotates the threaded rod 84. When the threaded rod 84 rotates, the threaded block 94 moves axially along the threaded rod 84 and toward the front of the body 24. As a result, the upper push-pull springs 50, 52 move forwardly and upwardly, thereby raising the front of the top 30. In addition, the length of cable 110 increases in the upper chamber 78 and shortens in the lower chamber 80, thereby moving the clamp 80 towards the rear of the body 24. This causes the lower push-pull springs 54, 56, to move rearwardly and upwardly, thereby raising the rear of the top 30.

To lower the top 30 of the trailer 20, the handle 90 is turned in the opposite direction which rotates the threaded rod 84 in the opposite direction. When the threaded rod 84 rotates, the threaded block 94 moves axially along the threaded rod 84 and toward the rear of the body 24. The weight of the top 30 causes the push-pull springs 50, 52, 54, 56 to retract. As the push-pull springs 50, 52, 54, 56 retract, the cable 110 is pulled by the retraction of the lower push-pull springs 54, 56.

While the threaded rod 84 is described as being directly coupled to the upper pair of push-pull springs 50, 52 and the cable 110 attached to the lower pair of push-pull springs 54, 56, it is to be understood that the threaded rod 84 could instead by directly coupled to the lower pair of push-pull spring 54, 56 and the cable 110 could be attached to the upper pair of push-pull springs 50, 52.

The specifics of the second embodiment of the drive assembly 44 are now described with reference to FIGS. 8 and 9.

The main housing 46' is identically formed to the main housing 46 of the first embodiment, except that the intermediate wall 70' is planar. Likewise, the pulley housing 48' and mounting of the pulley 104' therein (by threaded member 106' through the end wall 102' and a nut on the exterior of the end wall 102') are identically formed and mounted to the pulley housing 48 and mounting of the pulley 104 therein of the first embodiment. Therefore, like reference numerals identify like components, except that the numerals identifying the elements of the second embodiment include the prime thereafter.

The upper push-pull springs 50', 52' are mounted in the upper chamber 78' of the main housing 46' and extend outwardly therefrom toward the front of the body 24. The ends of the upper push-pull springs 50', 52' are joined together by a clamp 112. The lower push-pull springs 54', 56' are mounted in the lower chamber 80' of the main housing 46' and extend outwardly therefrom toward a rear end of the body 24. The ends of the lower push-pull springs 54', 56' are connected together by a clamp 114.

A screw drive housing 116 is attached to the front end of the main housing 46' between the main housing 46' and the frame 26. The screw drive housing 116 is preferably formed of metal and includes a lower cover 118 and a upper cover 120. The upper cover 118 is identically formed to the upper portion 66' of the main housing 46'. Likewise, the lower cover 120 is identically formed to the lower portion 68' of the main housing 46'. The upper and lower covers 118, 120 are joined together by suitable means, such as welding, to form an screw drive chamber 122. As shown, the front end plate 74' of the main housing 46' is attached to the front end of the screw drive housing 116 such that a one-piece housing is provided. The front end of the screw drive housing 116 is closed by an front end plate 124. It is to be understood that the screw drive housing 116 does not need to be directly attached to the main housing 46' and can otherwise be closed by end plates.

A metal threaded rod 124 is rotatably mounted in the screw drive housing 116 in the same manner that the threaded rod 84 is mounted to the main housing 46 in the first embodiment. Because in the embodiment shown the screw drive housing 116 is attached to the main housing 46', a rear bushing (not shown) is provided on the front end plate 74' on the interior of the screw drive housing 116. A front bushing (not shown) is provided on the end plate 124. The threaded rod 126 passes through the front bushing, through the end plate 124 and through a pinned washer (not shown) on the exterior of the end plate 124. The threaded rod 126 extends through the frame 26 of the trailer 20 and a handle 90 is attached to the end of the threaded rod 126. The rear end of the threaded rod 126 passes through the rear bushing, through the front end plate 74' and through a pinned washer (not shown) on the exterior of the front end plate 74'. The pinned washers secure the threaded rod 126 to the screw drive housing 116 to prevent axial movement of the threaded rod 126 relative to the screw drive housing 116, while allowing rotational movement of the threaded rod 126 relative to the screw drive housing 116.

A threaded block 128 is mounted on the threaded rod 126 between the end plates 74', 124 for travel therealong. A pulley 130 is rotatably mounted on the upper surface of the threaded block 128.

A cable 132 is attached to the front end wall 74' of the main housing 46', passes around the pulley 130, through the front end wall 74', between the upper push-pull springs 50', 54', through the clamp 112, through the rear end wall 76' proximate the upper chamber 78', around the pulley 104', through the rear end wall 76' proximate the lower chamber 80', and terminates at the clamp 114. The cable 132 is attached to the clamps 112, 114 and to the front end wall 74' by suitable means. The cable 132 is formed of a stainless steel. When the threaded block 128 travels along the threaded rod 128, the cable 132 is moved, thereby moving the upper and lower push-pull springs 50', 52', 54', 56'. When the position of the pulley 104' is changed, the position of the lower push-pull springs 54', 56' is adjusted relative to the upper push-pull springs 50', 52'. As a result, the height of the front and rear of the top 30 can be adjusted relative to each other in the even they become uneven from usage or from manufacturing inconsistencies in the top 30. This results in a significant advantage over the prior art which does not provide for ready adjustment without significant disassembly of the apparatus.

To raise the top 30 of the trailer 20, the handle 90 is turned which rotates the threaded rod 126. When the threaded rod 126 rotates, the threaded block 128 moves axially along the threaded rod 126 and toward the front of the body 24. As a result, the cable 132 lengthens within the screw drive chamber 122, the clamp 112 moves toward the front of the body 24 thereby moving the upper push-pull springs 50', 52' forwardly and upwardly and raising the front of the top 30, and the clamp 114 moves rearwardly toward the rear of the body 24 thereby moving the lower push-pull springs 54', 56' rearwardly and upwardly and raising the rear of the top 30.

To lower the top 30 of the trailer 20, the handle 90 is turned in the opposite direction which rotates the threaded rod 84 in the opposite direction. When the threaded rod 126 rotates, the threaded block 128 moves axially along the threaded rod 128 and toward the rear of the body 24. The weight of the top 30 causes the push-pull springs 50', 52', 54', 56' to retract. As the push-pull springs 50', 52', 54', 56' retract, the cable 132 is pulled by the retraction of the lower push-pull springs 54', 56'.

In each embodiment, because the pulley 104, 104' is contained within the pulley housing 48, 48' attached to the main housing 46, 46', a self-contained unit is provided. This allows for easy retrofit of the lift mechanism 22 to a trailer.

Furthermore, because the pulley 104, 104' is not mounted to the frame 26 of the trailer 20, only a single length of cable 110, 132 is necessary. If the pulley 104, 104' were mounted to the frame of the trailer, because different trailers have different dimensions, different lengths of cables may need to be used to install the lift mechanism which can lead to difficulties in assembly.

In each embodiment, the handle 90 can be offset from the threaded rod 84, 128 by a gear arrangement such as the one shown in U.S. Pat. No. 3,507,535, which disclosure is herein incorporated by reference. In addition, in each embodiment, while a manually-actuated handle 90 is described, it is to be understood that an electric motor with associated controls can be provided to rotate the threaded rod 84, 128.

While a threaded member 106, 106' and nut 108 are described for adjusting the position of the pulley 104, 104' within the pulley housing 48, 48', various other means of adjusting the position of the pulley 104, 104' are within the scope of the invention. For example, the threaded member 106, 106' can be replaced by sliding member that is fixed into place once desired position is attained.

While preferred embodiments of the present invention are shown and described, it is envisioned that those skilled in the art may devise various modifications of the present invention without departing from the spirit and scope of the appended claims.

The invention claimed is:

1. A drive assembly for lifting the top of a mobile housing, the mobile housing having a frame, said drive assembly comprising:
   at least one first push-pull element;
   a first member provided on said at least one first push-pull element;
   at least one second push-pull element;
   a second member provided on said at least one second push-pull element;
   a threaded member extending through said first member, said first member being axially translatable along said threaded member upon rotation of said threaded member;
   a pulley;
   a cable attached to said first member and said second member and extending around said pulley;
   a first housing and a second housing, said second housing being attached to said first housing and not directly connected to the frame of the mobile housing; said at least one first push-pull element and said at least one second push-pull element extending outwardly from said first housing; said first member and said second member being positioned within said first housing; said pulley being positioned within said second housing; and said cable extending through said first and second housings.

2. A drive assembly as defined in claim 1, further including means for adjusting the position of said pulley within said second housing.

3. A drive assembly as defined in claim 1, further including a threaded member attached to said pulley and to a wall of said second housing, said threaded member being capable of being lengthened or shortened within said second housing to adjust the position of said pulley within said second housing.

4. A drive assembly as defined in claim 1, further including a handle attached to said threaded member, said threaded member being rotated upon rotation of said handle.

5. A drive assembly for lifting the top of a mobile housing, the mobile housing having a frame, said drive assembly comprising:
   at least one first push-pull element;
   at least one second push-pull element;
   a first housing from which said at least one first and second push-pull elements extend;
   means for moving said at least one first and second push-pull elements;
   a second housing attached to said first housing and not directly connected to the frame of the mobile housing;
   a pulley mounted in said second housing; and
   a cable associated with said moving means, said at least one first push-pull element and said at least one second push-pull element and extending around said pulley.

6. A drive assembly as defined in claim 5, further including means associated with said pulley for adjusting the position of said pulley withing said second housing.

7. A drive assembly as defined in claim 5, further including a threaded member attached to said pulley and to a wall of said second housing, said threaded member being capable of being lengthened or shortened within said second housing to adjust the position of said pulley within said second housing.

8. A drive assembly as defined in claim 5, wherein said means for moving comprises a first member provided on said at least one first push-pull element, a second member provided on said at least one second push-pull element, a threaded member extending through said first member, said first member being axially translatable along said threaded member upon rotation of said threaded member, said cable being attached to said first member and said second member.

9. A drive assembly as defined in claim 5, wherein said means for moving comprises a first member provided on said at least one first push-pull element, a second member provided on said at least one second push-pull element, a threaded member, a third member provided on said threaded member, said third member being axially translatable along said threaded member upon rotation of said threaded member, said cable being attached to said first member, said second member and said third member.

10. A drive assembly as defined in claim 9, further including a third housing, said threaded member and said third member being provided in said third housing.

11. A drive assembly as defined in claim 10, further including a pulley provided on said third member, said cable being attached to said third housing, extending around said pulley provided on said third member, extending through said second housing, being attached to said first member, extending around said pulley in said second housing, and being attached to said second member.

* * * * *

UNITED STATES PATENT AND TRADEMARK OFFICE
CERTIFICATE OF CORRECTION

PATENT NO. : 6,981,729 B2  Page 1 of 1
APPLICATION NO. : 10/832016
DATED : May 10, 2005
INVENTOR(S) : Ko et al.

It is certified that error appears in the above-identified patent and that said Letters Patent is hereby corrected as shown below:

In the References Cited, please replace "5/2002 Nakase et al." with --5/2001 Nakase et al.--.
At column 7, line 32, please replace "comprising a PGB panel" with --comprising a PCB panel--

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 6,981,729 B2 Page 1 of 1
APPLICATION NO. : 10/832016
DATED : January 3, 2006
INVENTOR(S) : Edwin J. Steury It is certified that error appears in the above-identified patent and that said Letters Patent is hereby corrected as shown below:

This certificate supersedes certificate of correction issued September 19, 2006, should be vacated since no certificate of correction was granted for this patent number.

Signed and Sealed this

Twenty-fourth Day of October, 2006

JON W. DUDAS
*Director of the United States Patent and Trademark Office*